Patented July 30, 1940

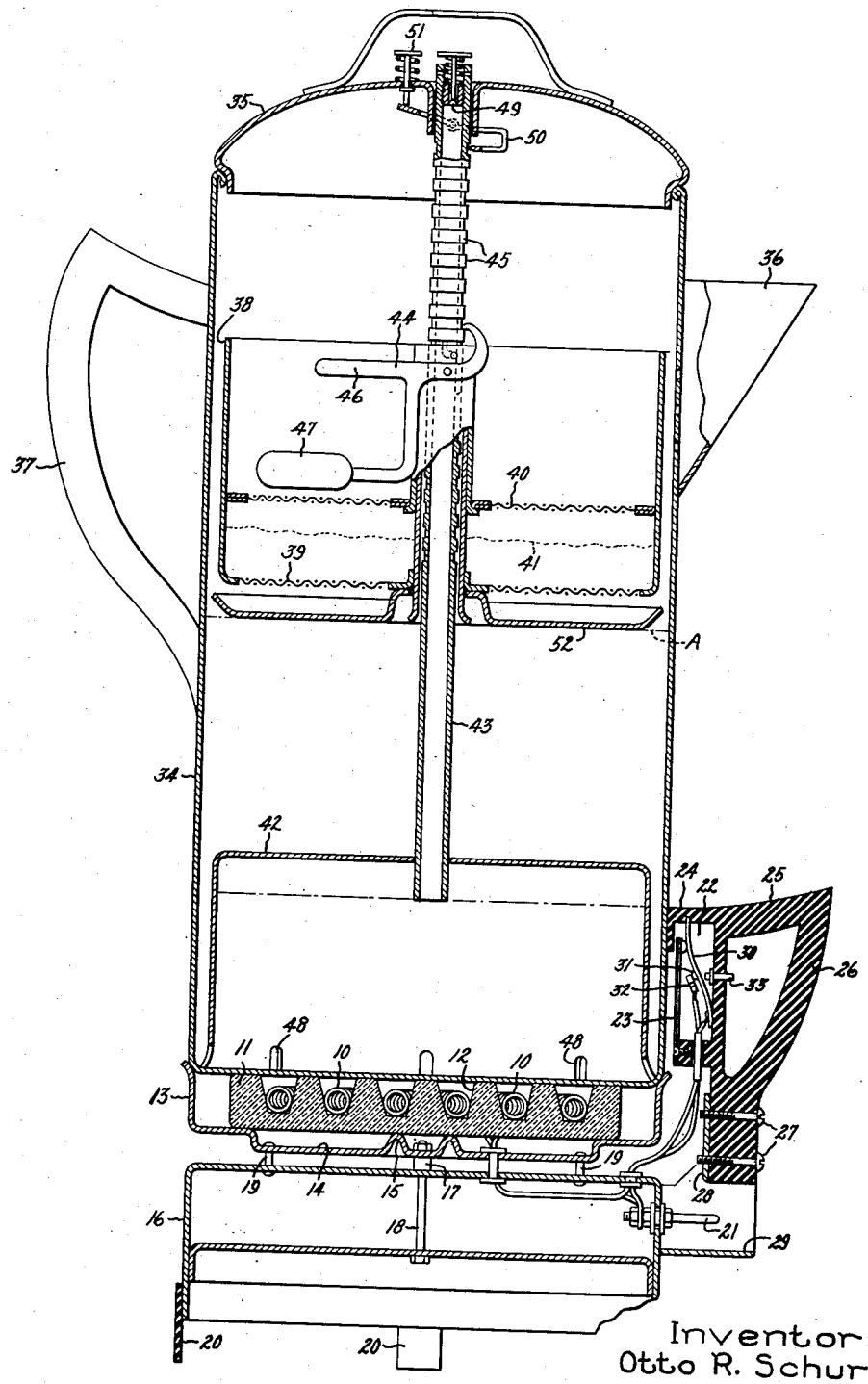

2,209,832

UNITED STATES PATENT OFFICE 2,209,832

ELECTRIC HEATER

Otto R. Schurig, Schenectady, N. Y., assignor to General Electric Company, a corporation of New York Original application July 31, 1937, Serial No. 156,736. Divided and this application October 20, 1938, Serial No. 236,046

4 Claims. (Cl. 219—43)

This invention relates to electric heaters, more particularly to electric heaters of the type known as "hotplates," and it has for its object an improved electric heater of this character which is automatic in its operation.

While not limited thereto, this invention is particularly applicable to hotplates for use with coffee makers and the like, and it contemplates an improved automatically controlled hotplate which turns off the heat to the coffee maker when the coffee infusion has been made.

In accordance with this invention, the hotplate includes a temperature responsive element which is located so as to be adjacent a wall of the coffee maker when the coffee maker is placed on the hotplate. In one form of my invention, I prefer to mount the temperature responsive element in a handle structure which is provided for the hotplate. The handle structure is elevated above the supporting surface of the plate and it is provided with a chamber in which the temperature responsive element is positioned. The chamber is open toward the hotplate so that when the coffee maker is placed on it the temperature responsive element responds directly to the thermal conditions of the adjacent wall of the coffee maker.

This application is a division of my copending application, Serial No. 156,736, filed July 31, 1937, and it is assigned to the same assignee as this copending application.

For a more complete understanding of the invention, reference should be had to the accompanying drawing in which the single figure is an elevation in section illustrating a hotplate embodying this invention, and also showing a coffee maker positioned on the hotplate and in operative relation with the temperature responsive element of the hotplate.

Referring to the drawing, this invention has been shown in one form as applied to an electrically heated hotplate used to heat a coffee maker of the type described and claimed in my above-mentioned copending application. As shown, the hotplate comprises a helical resistance conductor 10 mounted upon a suitable supporting brick 11. The supporting brick 11 is formed of any suitable heat resisting, electrically insulating material, and it is provided with grooves 12 in which the resistance conductor 10 is mounted. The brick 11 is housed in a casing 13 which in general has a pan-like shape. As shown, the casing 13 has in its bottom wall a depressed central section 14, and at the center of this depressed section there is an upright seam 15. The brick is supported by the section of the bottom wall outside of the depressed section 14 and by the upraised seam 15.

The casing 13 is supported upon a suitable base 16. It is supported in spaced relation with the base by means of a collar 17 mounted on a centrally arranged bolt 18. It is further attached to the base as by means of rivets 19. The base is provided with thermally insulating feet 20.

Mounted on one side of the base are a pair of twin supply terminals 21 which are adapted to receive the plug (not shown) of a suitable twin conductor supply cord.

Interposed in the electrical connections between the terminals 21 and the resistance conductor 10 is a suitable temperature responsive control element 22. This control element comprises a bimetallic thermostatic bar 23 mounted vertically within an electrically insulating housing 24 on the hotplate. This housing 24, as shown, is formed integrally with a handle structure 25 of the hotplate. The handle structure 25, it will be observed, is arranged to form the housing 24 and it also is provided with a hand-grasping member 26 opposite the housing. Preferably, the housing and hand-grasping portion will be molded of a suitable phenol condensation product, and it may be secured to the base 16 in any suitable manner, as by means of screw fastening means 27. The screws 27 function to secure the handle 25 to the base through the medium of a bracket 28 attached to the base. This bracket in addition to supporting the handle functions to remove the handle thermally from the base. As shown, the bracket 28 also defines a socket 29 for receiving the plug (not shown) of the supply conductor referred to above.

The bimetallic thermostat bar 23 controls a spring switch member 30 which carries a movable contact 31 that cooperates with a fixed contact 32. The contact 31 is connected through the spring 30 with one end of the resistance conductor 10, while the fixed contact 32 is connected with one of the twin supply terminals 21. The other terminal 21 is connected with the other end of the resistance conductor 10. Thus, the switch comprising the contacts 31 and 32 is connected in series with the resistance conductor 10 so that when these contacts are opened the resistance conductor is deenergized, whereas when they are closed the resistance conductor is energized.

It will be understood that when the temperature of the thermostatic member 23 attains a predetermined high value, it moves toward the right, as viewed in the figure, and snaps the switch arm 30 toward the right to break the contacts. The spring arm 30 is so arranged that when it is thus moved toward the right, it will remain in its right-hand position and will not of itself reclose the contacts even though the thermostatic bar 23 is subsequently cooled and moves toward the left. The spring arm 30 is returned to its closed position manually by means of a push-button 33 which is accessible on the exterior of the housing 22. Preferably, this push button will face the hand-grasping portion so as to be encircled by this portion, as clearly shown in the drawing.

While the electric hotplate of this invention may be used to control the temperature of any suitable vessel placed upon it, I have illustrated this invention in connection with a coffee maker such as described and claimed in my above mentioned copending application.

Briefly, this coffee maker comprises an infusion or steeping vessel 34 which is closed by a cover 35. It also is provided with a pouring spout 36 and a handle 37 opposite the spout. Positioned within the infusion receptacle 34 is a container 38 for receiving the coffee grounds. This container is provided with a perforated bottom wall 39 in the form of a screen, and also is provided with a similar cover 40 which is adapted to be placed above the coffee grounds 41.

The ground coffee container 38 is mounted upon a suitable bell-like member 42 which, as shown, has an unright tubular standard 43 upon which the container 38 is mounted. The coffee container is provided with a latching member 44 which is arranged to be latched in a series of notches or recesses 45 provided on the upper end of the tube 43. The latch is biased to its locking position, as shown in the figure, by means of a weight 46, and attached to the latch is a float 47 which, as will be pointed out later, releases the latch.

The bell 42 normally rests on the bottom of the receptacle and is provided at its lower edge with openings 48 so that water which is introduced to the infusion receptacle 34 can flow into the bell. The bell is vented through the tube 43 so that the water can flow into the bell. At the top of the tube there is a valve 49 which may be depressed to release the air from the bell.

Pivotally mounted on the cover 35 is a latching member 50 arranged so that if the rod 43 should be elevated, the latch will engage one of the recesses 45 to hold the rod in its elevated position. This latch is releasible by means of a manually depressible pin 51.

In the operation of the coffee maker, it will be understood that the coffe ground container will preferably be positioned slightly above the water level. For example, if the water level is at the line indicated A the ground coffee container will occupy the relative position to this level shown in the drawing. To assist in locating the container a float pan 52 is attached to the coffee container, as shown.

If now the water in the infusion receptacle be heated, the pressure generated under the bell will finally become so great that it will force the water out of the bell. The level of the water in the vessel 34, therefore, will rise, and will immerse the coffee grounds 41. When the level rises sufficiently, it will cause the float 47 to release the latch 44 and thereby release the ground coffee container. The coffee container, thereupon, will drop down in the vessel 10 and will rest on the top of the bell 42. Finally the bell 42 due to its buoyancy attained by the forcing out of the water and the generation of pressure under it will move upwardly and carry the ground coffee container out of the water. The tube 43 with the bell 42 and ground coffee container will be latched in their elevated positions by the member 50.

When the vessel 34 is placed on the hotplate its side wall will substantially close the open side of the chamber 22, as shown in the drawing; and as previously pointed out and shown in the drawing, the wall will be located adjacent the thermostatic element 23. The thermostatic element is thermally removed from the heating resistance 10 and brick 11, first by the base 16 which is relatively removed thermally from these elements, and second by the bracket 28 which still further removes the handle 26 thermally from the heating means; in addition, the handle which is formed of a phenol condensation product is a poor conductor of heat. Therefore, the thermostat 23 receives heat only from the adjacent wall of the vessel 34. And, as it is adjacent this wall it receives its heat from the wall by radiation. Therefore, when the water has been substantially pumped out of the bell 42, the temperature of the wall 34 increases and heats the thermostatic bar 23 until eventually the thermostatic bar attains such a high temperature that it functions in the manner previously described to shut off the heat automatically.

It will be understood, of course, that this invention is not limited to the coffee maker of the type illustrated. It may be used to cut off the heat from any suitable vessel that is placed on the stove when the temperature of its contents attains a predetermined high value. For example, an ordinary coffee percolator may be heated and controlled by this stove; or an ordinary pot of water may be so heated and controlled. It will be observed that except for the handle, the hotplate is entirely open so that vessels of various diameters may be placed on it and with a wall directly opposite the opening in the chamber 22 close to the thermostatic element 23.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric hotplate comprising a supporting member for the vessel, means for applying heat to a vessel placed on said supporting member, a thermostat controlling said heat applying means, a standard supporting said thermostat in an elevated position above said supporting member so that the thermostat is positioned opposite the side wall of a vessel placed on said supporting member to receive heat from said side wall, and the supporting member except for said standard being freely open to the reception of a vessel.

2. An electrically heated hotplate comprising a base, an electric heating element on said base adapted to support a vessel above it to heat the contents thereof, a handle attached to the side of said base extending upwardly above the surface of said heating element, means thermally insulating the handle from said base, the handle having walls defining a chamber that opens only toward the vessel when placed on said heating element, and a thermostatic element in said chamber controlling said heating element and exposed to the temperature of the adjacent wall of said vessel.

3. An electrically heated hotplate comprising a base, an electric heating element on said base adapted to support a vessel above it to heat the contents thereof, a handle attached to the side of said base extending upwardly above the surface of said heating element, the handle having walls defining a chamber that opens toward the vessel when placed on said heating element, and with a hand-grasping portion opposite said housing, a thermostatic cut-out switch connected in the circuit of said heating element mounted in said chamber and operative responsively to the temperature of the adjacent wall of a vessel placed on the heating element to move to a position to shut off the heat when said temperature attains a predetermined maximum, and a control element for said thermostatic cut-out switch manually movable to reset the switch to reenergize said heating element protruding from said housing at a point opposite said hand-grasping portion.

4. An electrically heated hotplate comprising a base, an electric heating element on said base adapted to support a vessel above it to heat the contents thereof, means defining a chamber above the surface of said heating element having an opening facing a vessel when placed on said surface, and a thermostatic element in said chamber controlling said heating element and positioned opposite said opening to receive radiant heat from the adjacent wall of the vessel opposite said opening.

OTTO R. SCHURIG.